United States Patent
Reber

[15] 3,664,102
[45] May 23, 1972

[54] CUTTER MECHANISM FOR AGRICULTURAL MACHINES OR LAWN MOWERS

[72] Inventor: Walter Reber, 50, avenue du Morechal Foch, Saverne, France

[22] Filed: May 11, 1970

[21] Appl. No.: 36,184

[30] Foreign Application Priority Data

May 14, 1969 France..................................6914884

[52] U.S. Cl..........................................................56/295
[51] Int. Cl. ......................................................A01d 55/18
[58] Field of Search....................56/295, 255, 6, 327 A, 17.5

[56] References Cited

UNITED STATES PATENTS

| | | | |
|---|---|---|---|
| 2,557,598 | 6/1951 | Daggett | 56/17.4 |
| 2,709,330 | 5/1955 | Lafferty et al. | 56/327 A |
| 3,389,539 | 6/1968 | Zweegers | 56/6 |
| 3,507,102 | 4/1970 | Kline et al | 56/12.3 |

Primary Examiner—Russell R. Kinsey
Attorney—Young & Thompson

[57] ABSTRACT

The disclosure is of a cutter mechanism for lawn mowers or for agricultural machines serving solely or partially for mowing which can be drawn by any motor vehicle to which they can be adapted, or can be self-propelled, which is characterized in that the elements intended to cut are solid or hollow wires or bands which can be of any form, profile and constitution, which wires or bands are mounted on fast-rotating supports, and in that the operative lengths of the assembly of wires or bands mounted on one and the same rotating support can be modified, preferably simultaneously by one single adjustment or even if necessary by two or at the very maximum by three adjustments, and in that the assembly of wires or bands mounted on one and the same rotating support can be locked again in the desired position, preferably without adjustment or by one single adjustment, if necessary by two or at the very maximum by three adjustments.

6 Claims, 10 Drawing Figures

INVENTOR
WALTER REBER
BY Young + Thompson
ATTYS.

3,664,102

CUTTER MECHANISM FOR AGRICULTURAL MACHINES OR LAWN MOWERS

INTRODUCTION AND BACKGROUND OF THE INVENTION

The present invention concerns a cutter mechanism for lawn mowers or for agricultural machines serving wholly or partially for mowing and capable of being drawn by any motor vehicle to which they can be adapted, or of being self-propelled. At present two large families of cutter mechanisms for mowing are known, namely:

Those having one or more blades driven with a reciprocating motion and

Those having one or more cutter support elements driven with a rotating movement and to which cutting elements are connected which generally have a rectangular and flat form, which elements are most frequently free in rotation or partially free in rotation about the axis of the element connecting them to the rotating support. In the latter type of cutter mechanism the requirement of having on the one hand a sufficient centrifugal force to permit the cutter elements to cut correctly and on the other hand a sufficient toughness of the cutter elements to permit working in pebbly ground, necessitates having cutter elements which possess a certain weight, which has the consequence that the drive of the rotary supports is frequently subjected to very violent impacts.

By the use of a quite large number of cutter elements per rotary support, the cutting width, that is to say the quantity of stems to be cut per cutting element, can be reduced. Thus the essential cutting force per cutting element can be reduced.

Moreover an increase of the rotation speed of the cutting element supports permits increasing the centrifugal force and consequently reducing the weight of the cutter elements.

Taking account of these considerations it is possible to use as cutter elements a certain number of quite thin wires or bands mounted on fast-rotating supports.

BRIEF SUMMARY OF THE INVENTION

The invention consists in utilizing as cutter elements solid or hollow wires of steel, nylon or any constitution which can have a smooth, toothed or other form and a round, square or other profile, or thin bands which can likewise have any constitution and form, which wires or bands are mounted on fast-rotating supports. In all cases the number of wires or bands will be at least greater than one and the linear velocity of the active part of the wires or bands will be greater than 50 meters per second.

The invention will be explained in greater detail hereinafter with reference to the accompanying drawings.

BRIEF DESCRIPTION OF THE VIEWS IN THE DRAWINGS

In the drawings:

FIG. 4a shows a section of the mechanism along the line 4a–4a in FIG. 1, equipped with wires;

FIG. 4b is a view similar to FIG. 4a but showing the device equipped with bands;

Figures 5, 6, 7:
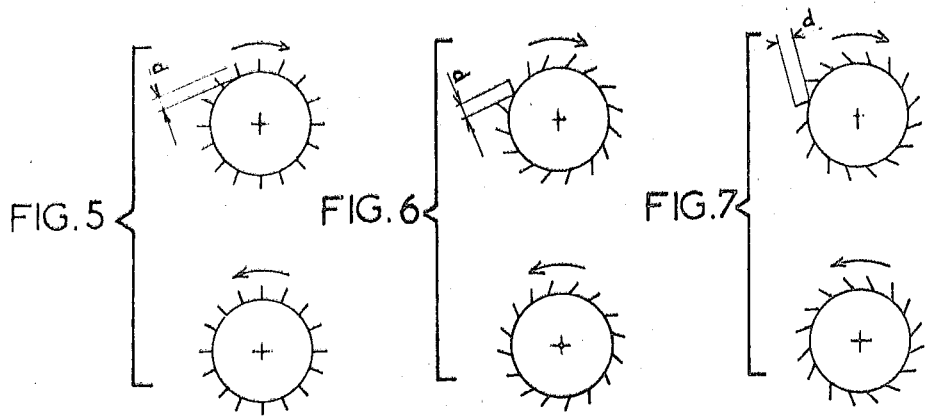
Figure 8:
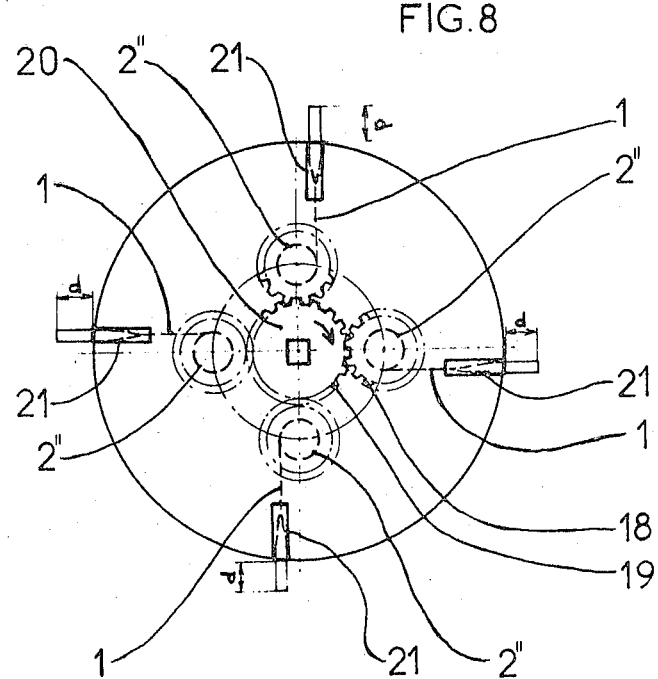
Figure 9:
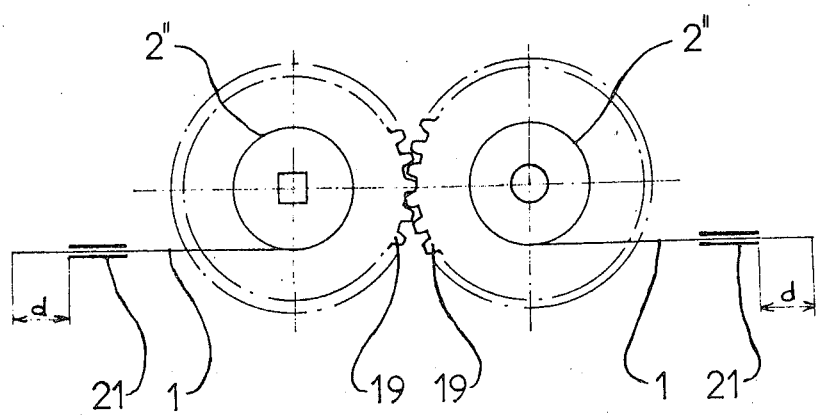

FIGS. 5, 6 and 7 represent the orientations of the wires or bands in the rotating supports and the directions of rotation of the latter, FIG. 8 is a schematic plan view of an alternative form of gear mechanism for the adjustment of the length of the wires or bands, in which each wire or band has its own reel; and FIG. 9 is a view similar to FIG. 8 but showing a modified form of gear mechanism in which each wire or band has its own reel.

DETAILED DESCRIPTION OF THE PREFERRED EMBODIMENTS

Figure 1:
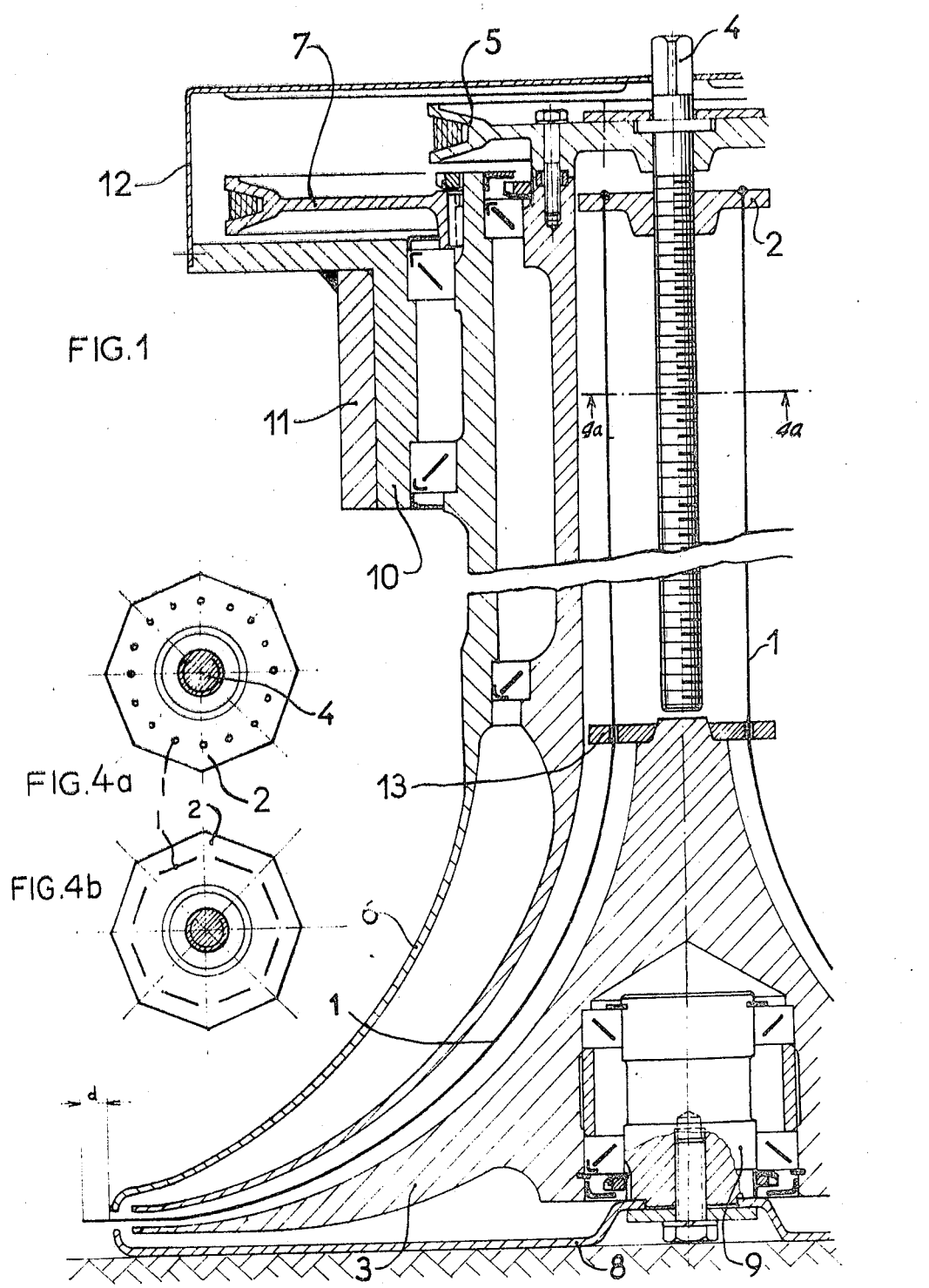
FIG. 1 is a partial vertical sectional view of a first embodiment according to the invention, situated substantially in the working position.

As represented in FIG. 1, the wires or bands 1 are fixed on an element 2 which can be displaced vertically in the fast-rotating support 3 by means of a left-hand threaded screw 4, for the purpose of simultaneous variation, in one single adjustment, of the cutting portions or operative parts $d$ of the wires or bands pertaining to one and the same rotating support. In this case the said rotating support is driven from above by means of a pulley 5.

An outer drum 6, which is rotatably supported on support 3 and can be made in one or more pieces and can further possess the particular features mentioned above, is driven by a pulley 7 so as to rotate less rapidly than the support 3. A lower guard 8 is fixed on a spindle 9 which is mounted loosely in the rotating support 3. A bearing sleeve 10 surrounds the assembly and is supported by a support 11. A guard 12 is carried by bearing sleeve 10 and encases the moving parts at the top of the device. The wires or bands 1 pass through a guide piece 13 which is supported by the rotating support 3.

Figure 2:
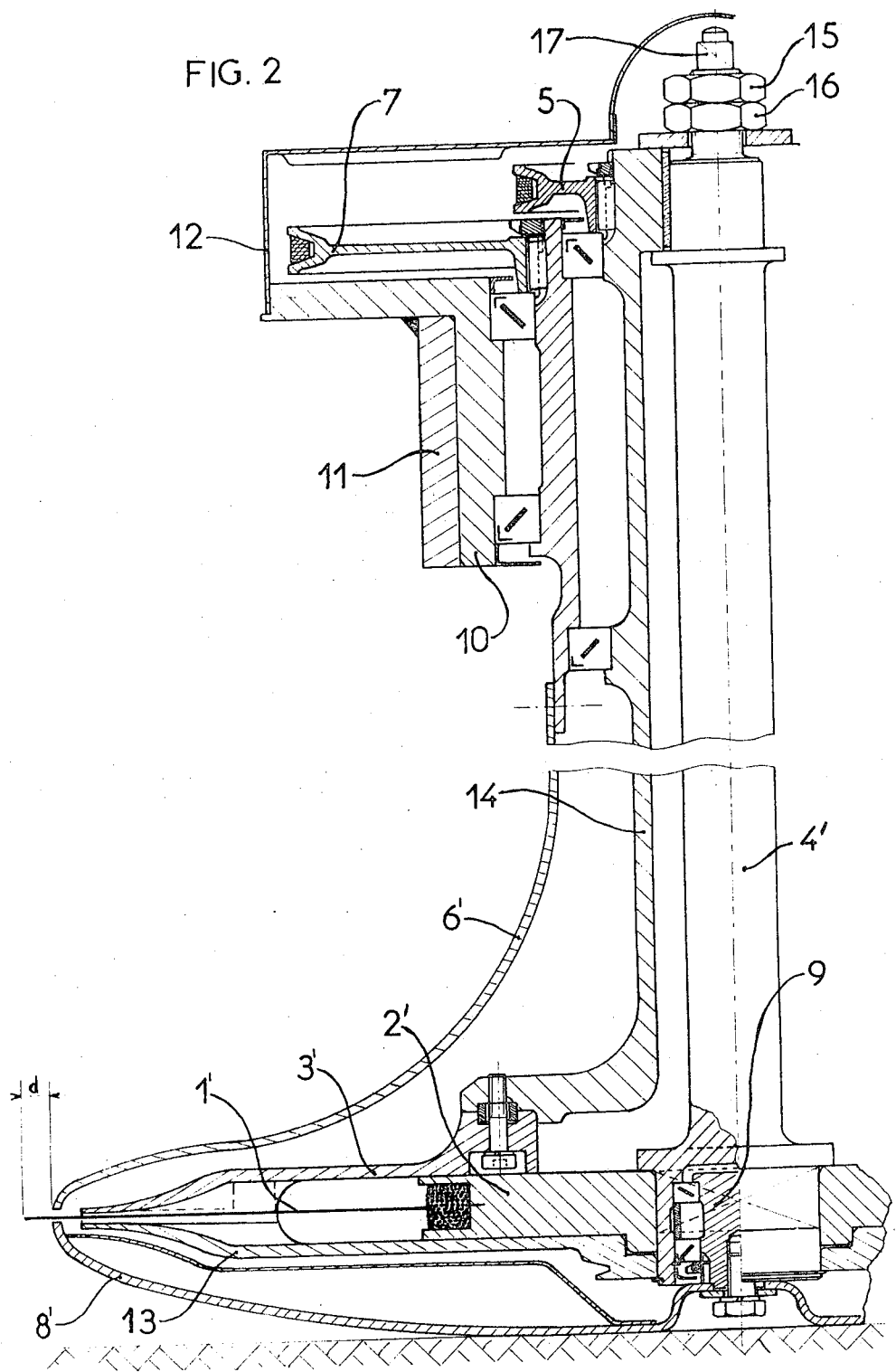
FIG. 2 is a view similar to FIG. 1 of a second embodiment.

According to the embodiment represented in FIG. 2, a pulley 5 drives a piece 14, a spindle 4' is secured to the said drive piece by a friction connection and/or by a locking piece or other means, a guide element 3' is secured to the piece 14 and a guide element 13 closes the element 3' from below. The spindle 4' drives the reel 2' which has a central square bore which receives a correspondingly squared end of spindle 4'. A plurality of wires 1' (only one of which is shown in FIG. 2) is wound on reel 2', it being understood that the wires 1' emerge from guide elements 3' and 13 at points equally spaced about the periphery of the device. Also, in a manner similar to the embodiment of FIG. 1, the outer drum 6' is rotatably supported on part 14, while the lower guide 8' remains substantially stationary on the ground.

This reel can be rotated by the spindle 4' relative to the drive and guide elements 3' and 13, for the purpose of simultaneous variation of the length of the operative parts $d$ of the assembly of wires pertaining to one and the same rotating support.

In fact in the stationary condition, by slightly slackening the nuts 15 and 16 so as to disengage the shaft 4' from rotation with the part 14 but so that the elements 3' and 13 are still assembled, and by rotating the shaft 4' in relation to the said drive member, thus relative to the said elements 3' and 13, it is possible adjustively to rotate the reel 2'.

Figure 3:
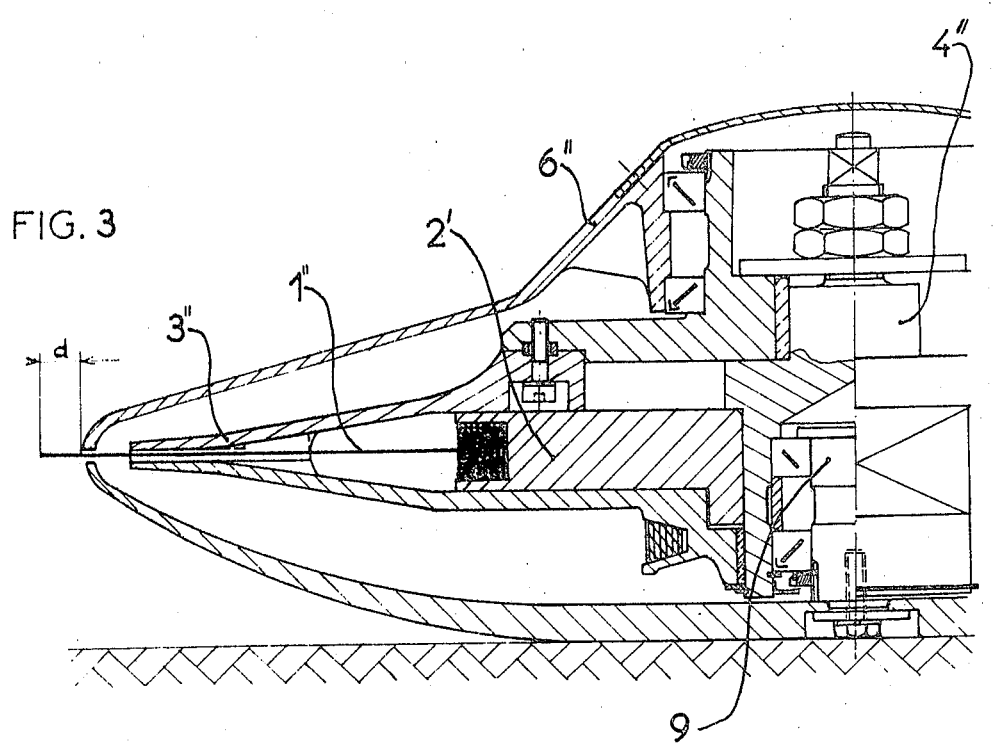
FIG. 3 shows a third embodiment of the mechanism in a partial sectional view.

FIG. 3 represents a variant of FIG. 2 with a drive from beneath and an element 6" mounted for free rotation above the cutting zone. As in the preceding embodiments, a spindle 4" drives the reel on which the wires are carried, and also drives the support 3', the assembly being closed by an outer drum 6", the principal differences being that the spindle 4" and drum 6" are shorter than in the preceding embodiments and that the drive is applied to the underside of the support 3". As before, however, the loosening of the spindle 4" and its rotation relative to the support 3" moves the wires or bands inwardly or outwardly depending on the direction of rotation.

FIGS. 5, 6 and 7 show some of orientations that will be assumed by the wires or bands, depending on the orientation of the guide means therefor, upon rotation in either direction.

FIGS. 8 and 9 show fragmentary diagrammatic views of two other possible embodiments of structure for storing and feeding the wire or band, which may be incorporated in any of the preceding embodiments of the apparatus.

In the example in FIG. 8, a partial and diagrammatic view from above, there are four reels 2" upon which thin deformable bands 1 are wound. These reels are provided with peripheral toothing 18 meshing with the toothing 19 of a control wheel 20. The bands 1 are guided in the desired manner in pieces 21 provided for this purpose. Thus the operative parts $d$ of these bands can be flat, twisted or of other forms. By rotation of the control wheel 20 about its axis of rotation in relation to its carrier element the operative parts $d$ of the bands which are associated with the same rotating support are varied simultaneously.

In the example in FIG. 9, a partial and diagrammatic profile view, there are two reels 2" upon which thin bands 1 are wound. These reels are provided with a peripheral toothing and meshed together. Thus by rotation of one of them about its axis of rotation the operative parts *d* of the assembly of bands pertaining to one and the same rotating support are varied simultaneously.

What is claimed is:

1. A cutter mechanism for lawnmowers or agricultural mowing machines, comprising a support rotatable about a vertical axis, means connected to said support for rotating said support about said vertical axis, a plurality of flexible elongated cutting elements supported by and extending horizontally outwardly from said support, and means connected to said cutting elements for simultaneously feeding a plurality of said cutting elements outwardly relative to said support thereby to extend said plurality of cutting elements beyond said support.

2. A cutter mechanism as claimed in claim 1, and reel means on which said flexible cutting elements are wound up for storage.

3. A cutter mechanism as claimed in claim 2, and means for rotating said reel means relative to said support to feed outwardly said plurality of cutting elements.

4. A cutter mechanism as claimed in claim 1, said feeding means comprising screw-threaded means coaxial with said rotatable member and means in engagement with said cutting elements and in screw-threaded engagement with said screw-threaded means to move said elements outwardly upon rotation of said screw-threaded means.

5. A cutter mechanism as claimed in claim 3, said reel means comprising a single reel coaxial with said vertical axis on which a plurality of said cutting elements are wound up in side-by-side relationship.

6. A cutter mechanism as claimed in claim 3, said reel means comprising a plurality of reels, and means for simultaneously rotating said reels in the same direction about parallel vertical axes.

* * * * *